March 11, 1924.
1,486,247
D. S. HUNTER
POSTHOLE DIGGER
Filed March 7, 1919    2 Sheets-Sheet 1
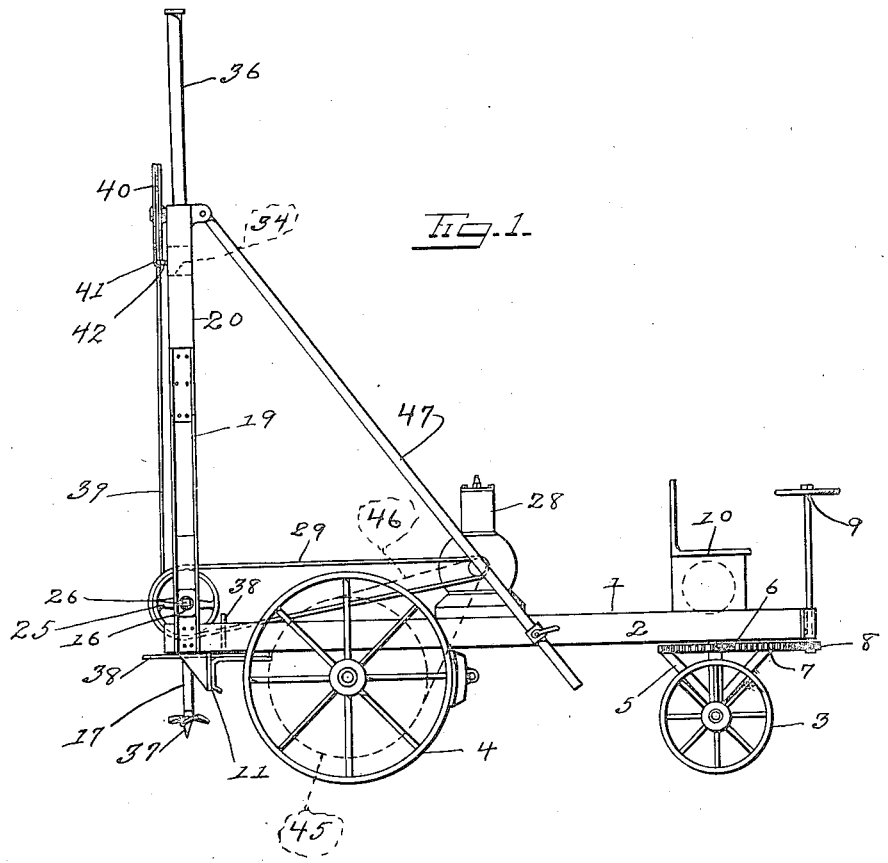

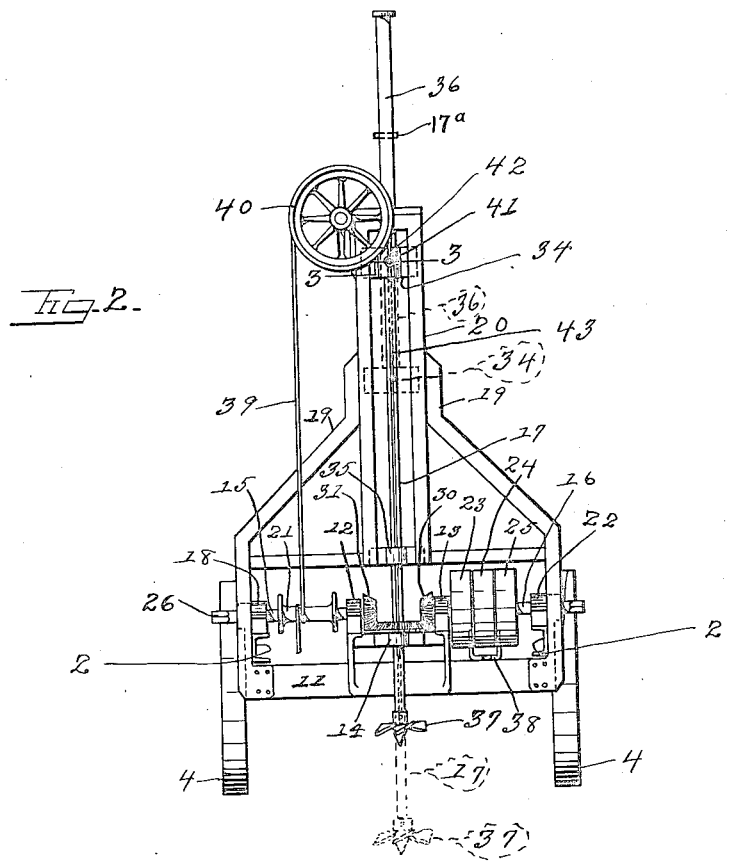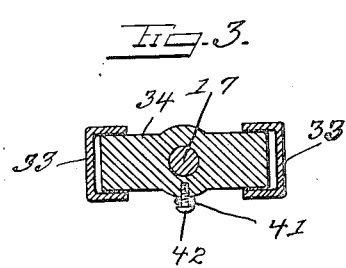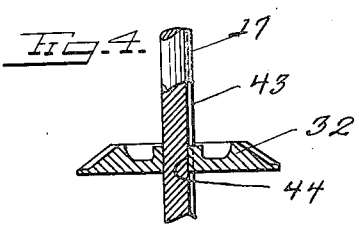

Patented Mar. 11, 1924.

1,486,247

UNITED STATES PATENT OFFICE.

DAVID S. HUNTER, OF GREENSBURG, PENNSYLVANIA.

POSTHOLE DIGGER.

Application filed March 7, 1919. Serial No. 281,170.

*To all whom it may concern:*

Be it known that I, DAVID S. HUNTER, a citizen of the United States, residing at Greensburg, in the county of Westmoreland and State of Pennsylvania, have invented certain new and useful Improvements in Posthole Diggers, of which the following is a specification.

My invention relates to certain new and useful improvements in earth boring machines, it being essentially provided for drilling or digging post holes, telephone pole holes, or the like.

It is my object to provide simple and efficient means for digging post holes or the like, and to this end, I mount upon a rectangular frame or truck, which may or may not be self propelled, certain mechanisms for revolving an auger or drill for digging the hole desired at a required depth, as will be hereinafter described.

With the above and other objects in view which will appear as the description proceeds, my invention consists in the novel arrangement and combination of parts hereinafter set forth, it being understood that changes in the precise embodiment of the invention, herein disclosed, can be made without departing from the spirit of the invention.

In the accompanying drawings I have illustrated one complete example of the physical embodiment of my invention constructed according to the best mode I have so far devised for the practical application of the principles of my invention.

Figure 1 represents a view in side elevation of my invention complete.

Figure 2 represents a rear view in elevation of my invention, the dotted lines illustrating the drill as in the ground.

Figure 3 represents a sectional view taken on line 3—3 of Figure 2, and

Figure 4 represents a transverse sectional view through the main bevel gear, the shaft being partly in section and partly in elevation.

In the drawings, the numeral 1 designates the main frame or supporting truck composed of the angle iron members 2, and supported upon the two pairs of wheels 3 and 4, the rear wheels 4 being mounted upon an axle (not shown) fixed to the truck 1, and the front wheels 3 being mounted upon an axle carried by the truck 5, pivoted to the main frame 1, at 6. This truck 5, has mounted thereon a quadrant 7, for engaging the pinion 8, carried by the lower end of the steering wheel 9, journalled in the main frame 1, and located near the driver's seat 10, the operation of this steering device just described will be at once apparent and further description is thought unnecessary.

Suspended from the rear end of the main frame 1, is the transverse support 11 for the bearing boxes 12, 13 and 14, in which are journalled the shafts 15, 16 and 17, respectively. The shaft 15 is also journalled in the bearing box 18, supported by one of the angle irons 2 and one of the supports 19 of the standard 20, which will be hereinafter described, and has mounted thereon, intermediate the boxes 12 and 18, the drum 21. The shaft 16, also has its outer end journalled in a bearing box 22, similar to box 18, and has intermediate of the two boxes 13 and 22, the three belt pulleys 23, 24 and 25, for forward, idle and slow speed or reverse, according to the desire of the manufacturer, respectively, as later described.

The extreme outer ends 26 of these two shafts 16 and 15 are squared to receive a crank (not shown) so that they may be manually operated when desired, but ordinarily they are driven by a prime motor 28, connected with the pulleys 23, 24 or 25, by a belt 29, and on their inner ends are the two similar bevel pinions 30 and 31, which engage the main bevel gear 32 for revolving the vertical shaft 17, as will be readily seen, when the main gear 32 is revolving, the drum 21 is revolved through the medium of its pinion 31.

The standard 20 is of rectangular shape and has the two side members 33 forming a guide for the crosshead 34 (see Figure 3) and at its lower end is the bearing box 35. Thus it will be seen that the vertical shaft 17 is journalled in the bearing box 14, passing up through the main bevel gear 32 and the bearing box 35 and cross-head 34, its upper end being protected by the casing 36, and on its lower end is secured a suitable auger or ground drill 37. This drill 37 being detachable to permit varying drills to be used, according to the character of ground to be bored.

When it is desired to drill a post hole, the drill 37 is first positioned above the proper place, the motor started and the belt 29 shifted, by means of the belt shifter 38, from the idler pulley 24 to the forward pulley 23, this causing the shaft 17 to revolve. The drill is then let down by means of the rope or ligament 39, passing over the pulley 40 journalled to the standard, and having its end 41 secured to the crosshead by means of the stud 42. The cross-head is of a required weight to force the revolving drill into the ground.

The shaft 17, to insure its revolving with the main gear 32, has therein the elongated slot or key way 43 which engages the key 44 of the main gear, this construction allowing the shaft to slide through the main gear and still be revolved thereby.

The shaft 17 is provided with a pin $17^a$, adapted to engage the upper side of the crosshead and limit the downward movement of the shaft 17.

After having drilled a hole the required depth, which may be judged from the graduations on the standard, the shaft is kept revolving and the rope or ligament 39 is wrapped around the drum 21, which is also revolving, and in this manner the drill raised.

When it is desired to propel the truck 1, by the motor, an arrangement somewhat on the order of that shown in Figure 1 by dotted lines may be employed, which comprises a pulley 45 secured to the rear wheel and a belt 46 connected with the motor in any desired practical manner.

If the ground is broken and unlevel, the standard can be so adjusted through the adjustable braces 47 as to permit the true drilling of the hole.

I claim:—

An earth boring machine comprising a frame, a vertically slidable shaft carried by said frame, the upper end of said shaft being slidably and rotatably mounted in a crosshead slidable in crosshead guides, the lower end of said shaft being slidably and rotatably mounted in spaced bearings, a bevel gear carried by said shaft and feathered thereon, driving mechanism for driving said bevelled gear, a drum located to one side of the bevelled gear carried by the shaft and operated through gear connections therewith, a pulley located adjacent the upper end of the shaft and carried by the frame, a cable connected to the crosshead and passing over the pulley and over the drum located adjacent the gear carried by the shaft, said cable forming means whereby the shaft may be lowered or raised as desired, a pin carried by the shaft above the crosshead for engaging the upper side of the crosshead and limiting the downward movement of the shaft, and an earth boring element carried by the lower end of the shaft.

In testimony whereof I affix my signature.

DAVID S. HUNTER.